(12) United States Patent
Van Bommel et al.

(10) Patent No.: US 11,985,738 B2
(45) Date of Patent: May 14, 2024

(54) DIMMABLE HELIX LED FILAMENT ARRANGEMENT AND LAMP

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 71 days.

(21) Appl. No.: 17/908,491

(22) PCT Filed: Feb. 22, 2021

(86) PCT No.: PCT/EP2021/054325
§ 371 (c)(1),
(2) Date: Aug. 31, 2022

(87) PCT Pub. No.: WO2021/175637
PCT Pub. Date: Sep. 10, 2021

(65) Prior Publication Data
US 2023/0091712 A1    Mar. 23, 2023

(30) Foreign Application Priority Data
Mar. 2, 2020 (EP) ..................................... 20160319

(51) Int. Cl.
*H05B 45/10* (2020.01)
*F21K 9/232* (2016.01)
*F21Y 115/10* (2016.01)

(52) U.S. Cl.
CPC ............ *H05B 45/10* (2020.01); *F21K 9/232* (2016.08); *F21Y 2115/10* (2016.08)

(58) Field of Classification Search
CPC ..... H05B 45/10; F21K 9/232; F21Y 2115/10; Y02B 20/30
See application file for complete search history.

(56) References Cited

U.S. PATENT DOCUMENTS 10,473,273 B1 * 11/2019 Zolotykh ............... H05B 45/39
2017/0241597 A1 * 8/2017 Yeung ........................ F21K 9/90
(Continued)

FOREIGN PATENT DOCUMENTS

| CN | 209672092 U | 11/2019 |
|---|---|---|
| CN | 209782275 U | 12/2019 |

(Continued)

*Primary Examiner* — Minh D A (57) ABSTRACT

The present disclosure relates to a LED filament system (100) comprising a LED filament arrangement (105) and a controller (120). The LED filament arrangement comprises a plurality of LED filaments (110a-c). The LED filaments are interwound around a common central axis (A) such that each LED filament has a spiral-shape. In the LED filament arrangement, two neighboring LED filaments differ by a translation pitch (t) along the central axis. The controller is configured to control power supply to the LED filaments such that at least one of the plurality of LED filaments is individually controllable. The controller is further configured to control the power supply to the LED filaments in a first mode, in which all of the LED filaments are in an on-state and the controller provides power supply above a first power level to the LED filaments. The controller is further configured to control the power supply to the LED filaments in a second mode in which at least one of the LED filaments is in an off-state.

10 Claims, 5 Drawing Sheets

(56) References Cited

U.S. PATENT DOCUMENTS

2018/0045379 A1\* 2/2018 Jiang .................. F21K 9/232
2018/0094777 A1 4/2018 Vargas-Chambers
2019/0049073 A1 2/2019 Eckert

FOREIGN PATENT DOCUMENTS

| IT | TO20110132 A1 | 8/2012 |
|---|---|---|
| WO | 2019109978 A1 | 6/2019 |
| WO | 2019197394 A1 | 10/2019 |

\* cited by examiner

DIMMABLE HELIX LED FILAMENT ARRANGEMENT AND LAMP

CROSS-REFERENCE TO PRIOR APPLICATIONS

This application is the U.S. National Phase application under 35 U.S.C. § 371 of International Application No. PCT/EP2021/054325, filed on Feb. 22, 2021, which claims the benefit of European Patent Application No. 20160319.8, filed on Mar. 2, 2020. These applications are hereby incorporated by reference herein.

TECHNICAL FIELD

The present disclosure relates generally to the field of solid-state lighting. Specifically, it relates to a LED filament arrangement and a LED filament lamp.

BACKGROUND

Incandescent lamps are rapidly being replaced by LED-based lighting solutions. It is nevertheless appreciated and desired by users to have retrofit lamps which have the look of an incandescent bulb.

Solid-state lighting devices may provide many advantages over their incandescent, fluorescent, and gas-discharge based counterparts. For instance, they may provide increased operational life, reduced power consumption and higher efficacy. Solid-state lighting devices, such as LEDs, are employed in a wide range of lighting applications.

Development of LED-based lighting devices is ever ongoing and may provide new solutions extending far beyond what has been possible using conventional light sources.

In CN 209672092 a light bulb is disclosed that includes a bulb housing, a heat sink, and a head housing arranged in series along a longitudinal axis of the light bulb. The light bulb includes a first filament having a first LED chip capable of emitting a first light with a first color characteristic, and a second filament having a second LED chip capable of emitting a second light with a second color characteristic. The first filament and the second filament are spiral along a transverse axis perpendicular to the longitudinal axis of the light bulb. The light bulb further includes a driving module configured to enable one or a combination of the first filament and the second filament to emit light.

SUMMARY

One general aim of the present disclosure is to provide low-cost dimmable LED filament systems with a pleasant appearance.

It is therefore an object of the present invention to meet at least some of the above-mentioned goals, and to provide improved lighting solutions.

This and other objects are achieved by means of a LED filament system as defined in the appended independent claim. Other embodiments are defined by the dependent claims.

According to a first aspect of the present disclosure, a light-emitting diode (LED) filament system is provided. The LED filament system comprises a LED filament arrangement including a plurality of LED filaments. The plurality of LED filaments is interwound around a common central axis, such that each of the LED filaments has (forms) a spiral-shape. Neighboring LED filaments differ by a translation pitch along the common central axis.

The LED filament system further comprises a controller. The controller is configured to control power supply to the LED filaments such that at least one of the plurality of LED filaments is individually controllable. Further, the controller is configured to control the power supply to the LED filaments in a first mode, in which all the LED filaments are in an on-state, and the controller provides power supply above a first power level to the LED filaments. The controller is further configured to control the power supply to the LED filaments in a second mode, in which at least one of the LED filaments are in an off-state.

It will be appreciated that the positions of the different LED filaments within the LED filament arrangement do not coincide. Rather, the respective arrangements of the LED filaments may differ by a translation along the central axis and/or a rotation around the central axis. The translation pitch is the distance between two neighboring LED filaments of the LED filament arrangement in a direction along the central axis.

The controller may, through controlling the power supply to the LED filaments, control the luminous flux of the LED filament arrangement. Controlling a light source to provide a luminous flux lower than a maximum luminous flux may be referred to as dimming the light source. The ability to dim light sources is highly appreciated by users.

The present LED filament system may provide a dimmable lighting solution at a low cost.

According to some embodiments, the LED filament arrangement may, for a given translation pitch (t), provide a light distribution corresponding in the first mode to a uniform light-emitting surface, and in the second mode to at least one light-emitting spiral.

The controller may control the LED filament arrangement (in a first mode) such that all LED filaments are illuminated (in an on-state, emitting light). The arrangement of the LED filaments may provide the LED filament arrangement with an appearance that the light originated from a (single) light-emitting surface or a volumetric light source. The arrangement of the LED filaments may, when all LED filaments of the LED filament arrangement are illuminated and when they emit light above a certain intensity (corresponding to a first power level provided by the controller), provide an appearance that the light originates from a single tubular/cylindrical light-emitting surface. The controller may also control the LED filament arrangement (in a second mode) such that at least one LED filament is not illuminated (in an off-state, not emitting light), which may provide the LED filament arrangement with an appearance of one or more spiral LED filaments.

According to some embodiments, in the LED filament arrangement, the translation pitch (t) may be in a range from 1 to 5 times the width (w) of one of the LED filaments (i.e. $1w \leq t \leq 5w$).

For example, the translation pitch may be in a range from 2 to 4.5 times the width (i.e. $2w \leq t \leq 4.5w$). More specifically, the translation pitch may be in a range from 3 to 4 times the width (i.e. $3w \leq t \leq 4w$).

Using an example in which the width of a LED filament is 2.5 mm, the translation pitch may be in the range 2.5-12.5 mm. Specifically, in embodiments in which the width of a LED filament is 2.5 mm, the translation pitch may be in the range 5-11.25 mm. More specifically, in embodiments in which the width of a LED filament is 2.5 mm, the translation pitch may be in the range 7.5-10 mm.

A translation pitch according to the present embodiments may provide a balance between improved thermal management and the provision of an appearance of a continuous light-emitting surface when all LED filaments are illuminated.

According to some embodiments, each of the LED filaments may be arranged in a spiral-shape having a substantially constant spiral pitch. The spiral pitch may be the distance between successive loops of the spiral-shape.

Embodiments in which each LED filament is arranged in a spiral-shape having a substantially constant spiral pitch may provide a more uniform light distribution and a more pleasant appearance.

For example, the spiral pitch may differ by less than 20%. Specifically, the spiral pitch may differ by less than 10%. More specifically, the spiral pitch may differ by less than 5%.

According to some embodiments, the spiral pitch (p) may be in a range from 8 times the width (w) of a LED filament to 20 times the width (w) (i.e. $8w \leq p \leq 20w$).

For example, the spiral pitch may be in a range from 10 to 19 times the width (i.e. $10w \leq p \leq 19w$) Specifically, the spiral pitch may be in a range from 12 to 18 times the width (i.e. $12w \leq p \leq 18w$). More specifically, the spiral pitch may be in a range from 14 to 16 times the width (i.e. $14w \leq p \leq 16w$).

Using an example in which the width of a LED filament is 2.5 mm, the spiral pitch may be in the range 20-50 mm. Specifically, if the width of a LED filament is 2.5 mm, the spiral pitch may be in the range 22.5-45 mm. More specifically, when the width of a LED filament is 2.5 mm, the spiral pitch may be in the range 25-37.5 mm.

According to some embodiments, the width (w) of a LED filament may be in a range from 1 to 4 mm.

For example, the width may be in a range from 1.8 to 3.5 mm. More specifically, the width may be in a range from 2 to 3 mm.

A pitch aspect ratio (PAR) may be defined as the ratio of the spiral pitch to the translation pitch (i.e. PAR=p/t). For example, the PAR may be in a range from 2 to 8. Specifically, the PAR may be in a range from 3 to 6. More specifically, the PAR may be in a range from 4 to 5.

According to some embodiments, the controller may be configured to receive an input signal which represents a desired luminous flux. The controller may further be configured to select, based on the desired luminous flux, at least one LED filament to which to provide power. Further, the controller may be configured to select a power level of the at least one LED filament to provide the desired luminous flux, and to provide power in accordance with the selected power level to the at least one selected LED filament.

It will be appreciated that when more than one LED filament is selected, each of the LED filaments may receive an individual power level. The individual power levels may be the same for some or all LED filaments. The individual power levels may be different for some or all LED filaments. When more than one LED filament is selected, the controller may provide each selected LED filament with power in accordance with its individual power level. Alternatively, two or more of the LED filaments may be controlled together. For example, two or more of the LED filaments may be connected in series or parallel.

Individual (or group) powering of the LED filaments may provide dimming solutions in which, for a desired total luminous flux of the LED filament arrangement, a subset of the LED filaments may be illuminated to provide a higher flux level instead of all LED filaments being illuminated to provide a same, lower flux level. Such dimming solutions may be more efficient than conventional dimming, as the LED filaments may be operated closer to their optimal efficiency.

According to some embodiments, the controller may be configured to provide power supply to only one LED filament if the desired luminous flux is below a first limit.

One LED filament being illuminated, and the rest being turned off, may give the LED filament arrangement the appearance of a single LED filament. For low luminous flux levels, for example below 450 lm, using one LED filament may provide the most pleasant appearance and illumination.

According to some embodiments, the controller may be configured to provide power supply to all LED filaments if the desired luminous flux is above a second limit.

For a high luminous flux, such as above 600 lm, all the LED filaments may be illuminated. In embodiments in which LED filaments are arranged closely together, illuminating all LED filaments may provide the appearance of a continuous cylinder-shaped light source. For high luminous flux levels, (the appearance of) a light-emitting surface may provide the most pleasant look and illumination.

According to some embodiments, if the desired luminous flux is above a threshold corresponding to a maximum flux level of a first LED filament, the controller may be further configured to provide power to the first LED filament corresponding to the maximum flux level. The controller may further be configured to provide power to a second LED filament to achieve the desired luminous flux.

For example, for desired luminous flux levels which are achievable using only one LED filament, only the first LED filament may be powered. When the desired luminous flux level exceeds what may be provided by one LED filament, the first LED filament may be powered at the highest level, and a second LED filament may be powered to reach the desired luminous flux. Similarly, if the desired luminous flux exceeds the combined maximum luminous flux level of the first and the second LED filament, the first and the second LED filaments may be powered at the highest level, and a third LED filament may be powered such that the LED filament arrangement may reach the desired luminous flux.

According to some embodiments, if the desired luminous flux is above a threshold corresponding to a maximum flux level of a first LED filament, the controller may be further configured to provide power to the first LED filament and at least one second LED filament at equal levels.

For example, for desired luminous flux levels which are achievable using a single LED filament, a first LED filament may be powered. If the desired luminous flux exceeds the maximum luminous flux level of the first LED filament, both the first LED filament and a second LED filament may be powered at equal (same) levels, such that the LED filament arrangement may provide the desired luminous flux. If the desired luminous flux exceeds the combined maximum luminous flux of the first LED filament and the second LED filament, the first LED filament, the second LED filament and a third LED filament may be powered at equal levels such that the LED filament arrangement may provide the desired luminous flux.

Providing even power levels to the illuminated LED filaments may provide a more uniform illumination. Further, such a solution may provide that the LED filaments are more evenly used and more evenly worn, which may lead to a longer operational life for the LED filament system.

According to some embodiments, if the desired luminous flux is above a first threshold corresponding to a maximum flux level of a first LED filament and below a second threshold, the controller may be configured to provide power to the first LED filament at a first level, the first level being lower than the maximum flux level and provide power to a second LED filament at a second level lower than the first level. If the desired luminous flux is above the second threshold, the controller may be configured to provide power to the first LED filament and the second LED filament at equal levels (or at least substantially equal levels).

For example, for desired luminous flux levels which are achievable using one LED filament, a first LED filament may be powered. If the input increases to correspond to luminous flux levels above the maximum luminous flux one single LED filament, the power supply to the first LED filament may be gradually decreased simultaneously with a more rapid gradual increase in the power supplied to a second LED filament. For a certain input level, corresponding to the second threshold, the first LED filament and the second LED filament may be powered at equal levels (or at least substantially equal power levels). For inputs corresponding to flux levels above the second threshold, the first LED filament and the second LED filament may be equally powered.

Gradual lowering of the power supply of the first LED filament, combined with an increase of the power supply of the second LED filament, may provide a smoother transition between powering of one LED filament and two LED filaments. Similar control may be applied for transitions between e.g. three and four LED filaments, four and five LED filaments etc.

According to some embodiments, each of the LED filaments may be arranged in a spiral-shape having a substantially constant radius. In other words, the distance from the LED filament to the central axis may be substantially constant. LED filaments in accordance with these embodiments may form a cylindrical coil or a helical shape.

For example, the radius of the spiral-shape may differ by less than 20%. Specifically, the radius of the spiral-shape may differ by less than 10%. More specifically, the radius of the spiral-shape may differ by less than 5%.

For example, the radius of the spiral-shape may be in the range 1-10 cm. Specifically, the radius of the spiral-shape may be in the range 2-8 cm. More specifically, the radius of the spiral-shape may be in the range 3-6 cm.

According to some embodiments, the LED filament arrangement may comprise 2 to 8 LED filaments. For example, the LED filament arrangement may comprise 3 to 7 LED filaments. Specifically, the LED filament arrangement may comprise 3 to 5 LED filaments. More specifically, the LED filament arrangement may comprise four LED filaments. Four LED filaments in the LED filament arrangement may form a quadruple helix.

In some embodiments, the LED filaments may be substantially identical in shape and size.

For example, the LED filaments may have substantially the same width. The LED filaments may have substantially the same length. The LED filaments may have substantially the same diameter. The LED filaments may provide light with substantially the same color temperature. The LED filaments may provide light with substantially the same color rendering index (CRI).

For example, the size of the LED filaments may differ by less than 20%. Specifically, the size of the LED filaments may differ by less than 10%. More specifically, the size of the LED filaments may differ by less than 5%.

For example, the shape of the LED filaments may differ by less than 20%. Specifically, the shape of the LED filaments may differ by less than 10%. More specifically, the shape of the LED filaments may differ by less than 5%.

According to a second aspect of the present disclosure, a lighting device is provided. The lighting device may comprise a LED filament system as described above in any of the embodiments of the first aspect of the present disclosure. The lighting device may further comprise an at least partially light-transmissive envelope. The envelope may envelop at least the plurality of LED filaments of the LED filament system. The lighting device may further comprise a base on which the envelope may be mounted. The base may be adapted to be connected with a luminaire socket.

The controller of the LED filament system may be at least partly arranged within the base of the lighting device. Alternatively, or additionally, the controller of the LED filament system may be at least partly arranged within the envelope of the lighting device.

It is noted that other embodiments using all possible combinations of features recited in the above described embodiments may be envisaged. Thus, the present disclosure also relates to all possible combinations of features mentioned herein.

BRIEF DESCRIPTION OF DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
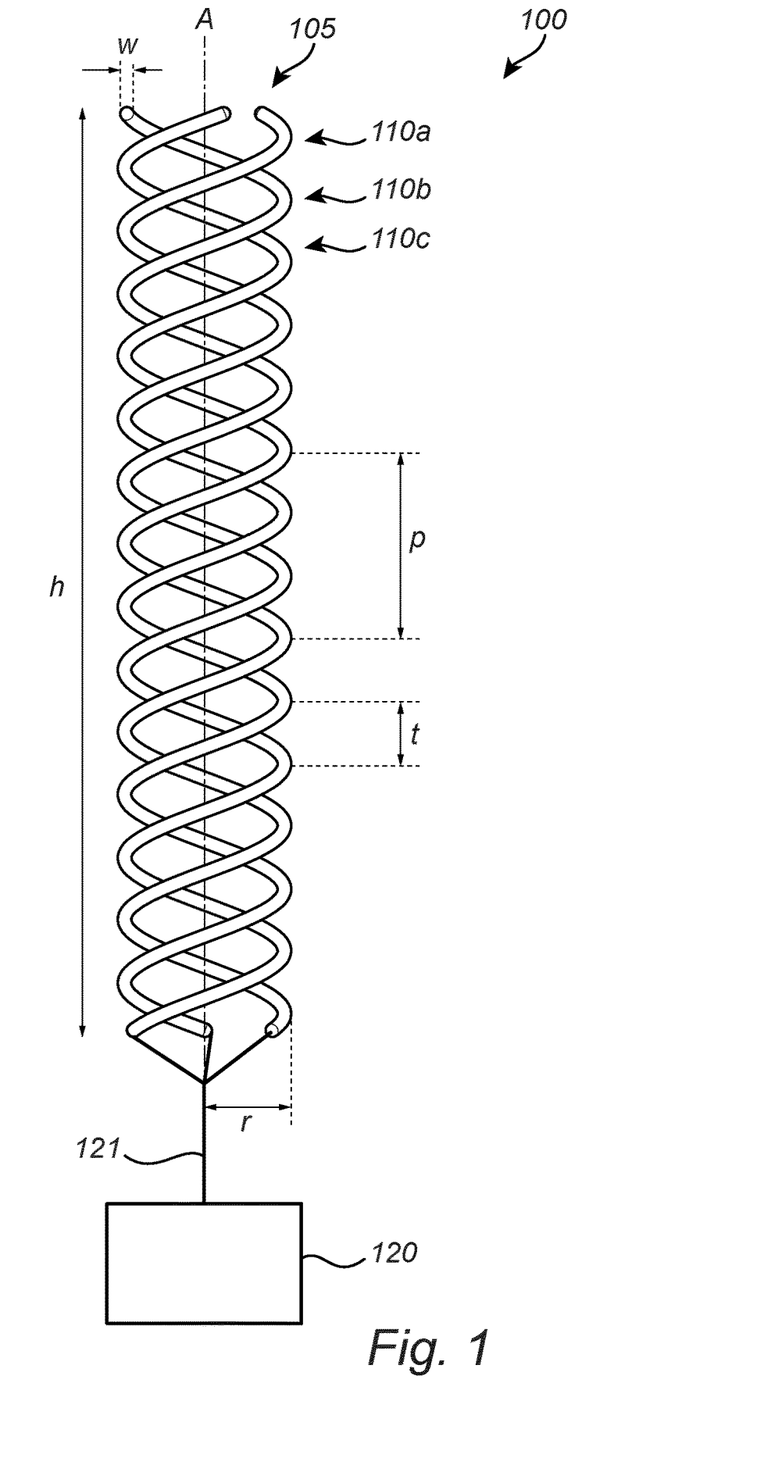
FIG. 1 is a schematic illustration of a LED filament system in accordance with some embodiments.

With reference to FIG. 1, a LED filament system 100, in accordance with some embodiments, will be described.

The LED filament system comprises a plurality of LED filaments 110a-c, and a controller 120. The plurality of LED filaments 110a-c comprises three LED filaments: a first LED filament 110*a*, a second LED filament 110*b*, and a third LED filament 110*c*. In the following, when referring to the LED filaments 110 (without the suffix a-c), the description applies to each of the LED filaments 110*a-c*. When an individual LED filament is described, the suffix a-c will be used.

The LED filaments 110 are each arranged forming a spiral-shape. More specifically, the LED filaments 110 each form a helix winding around a central axis A. The helix-shapes each have a (substantially) constant radius r. The radius r is the shortest distance from a point of the LED filament 110 to the central axis A. Furthermore, each of the helix-shapes have a (substantially) constant spiral pitch p. The spiral pitch p is the length of a loop of the helix-shape of the LED filament 110 in the direction of the central axis. In other words, it is distance between a starting point of a loop, and a starting point of the successive loop. The LED filaments 110 each have a width w, and their spiral- (helix-) shapes have a height h. The LED filaments 110 are substantially identical in shape and size.

The LED filaments 110*a-c* are arranged around the common central axis A. In other words, the LED filaments 110*a-c* are coaxial. The positions of the LED filaments 110*a-c* differ by a rotation around the central axis, such that two neighboring LED filaments 110 differ by a translation pitch t along the central axis A. In FIG. 1, the translation pitch t between the first LED filament 110*a* and the second LED filament 110*b* is illustrated. However, the translation pitch between each pair of successive LED filaments 110 may be (substantially) equal.

In the present embodiment, the LED filament arrangement 105 comprises three LED filaments 110. The width w of the LED filaments 110 may be 2.5 mm. The pitch aspect ratio (PAR), which is the ratio of the spiral pitch p to the translation pitch t, may be 3, i.e.

$$PAR = \frac{p}{t} = 3.$$

For example, the spiral pitch p may be nine times the LED filament width w, i.e. p=9w=223 mm. The translation pitch t may be three times the LED filament width w, i.e. t=3w=7.5 mm.

In another example, the LED filament arrangement may comprise four LED filaments. The width ($w_2$) of the LED filaments may be 2 mm. The PAR may be four. In this example, the spiral pitch may be 12 times the LED filament width, i.e. $p_2=12w_2=24$ mm. The translation pitch may be 3 times the LED filament width, i.e. $t_2=3w_2=6$ mm.

In a third example, the LED filament arrangement may comprise five LED filaments. The width ($w_3$) of the LED filaments may be 3 mm. The PAR may be five. In this example, the spiral pitch may be 10 times the LED filament width, i.e. $p_3=10w_3=30$ mm. The translation pitch may be 2 times the LED filament width, i.e. $t_3=2w_3=6$ mm.

It will be appreciated that, in general, a LED filament may provide LED filament light and comprise a plurality of light emitting diodes (LEDs) arranged in a linear array. Preferably, the LED filament may have a length L and a width W, wherein L>5W. The LED filament may be arranged in a straight configuration or in a non-straight configuration such as for example a curved configuration, a 2D/3D spiral or a helix, such as illustrated in for example FIG. 1. Preferably, the LEDs may be arranged on an elongated carrier, like for instance a substrate, that may be rigid (made from e.g. a polymer, glass, quartz, metal or sapphire) or flexible (e.g. made of a polymer or metal e.g. a film or foil).

In case the carrier comprises a first major surface and an opposite second major surface, the LEDs may be arranged on at least one of these surfaces. The carrier may be reflective or light transmissive, such as translucent and preferably transparent.

The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods.

The LED filament may comprise multiple sub-filaments.

The controller 120 of the LED filament system 100 is configured to control the power supply to the LED filaments 110*a-c*. Specifically, the controller 120 is configured to control the power supply to each one of the LED filaments 110*a-c* via the electrical connections 121.

At a general level, the controller may be configured to control the LED filament arrangement according to at least two operating modes depending on a received input. In a first operating mode, the controller may be configured to operate the LED filament arrangement such that only one LED filament is turned on. In this first operating mode, the lighting device would resemble a lamp having a spiral-shaped filament. In a second operating mode, the controller may be configured to operate the LED filament arrangement such that all LED filaments are turned on. In this second operating mode, the lighting device would resemble a lamp from which light is emitted from all sides, i.e. like a volumetric light emitter.

Figure 2:
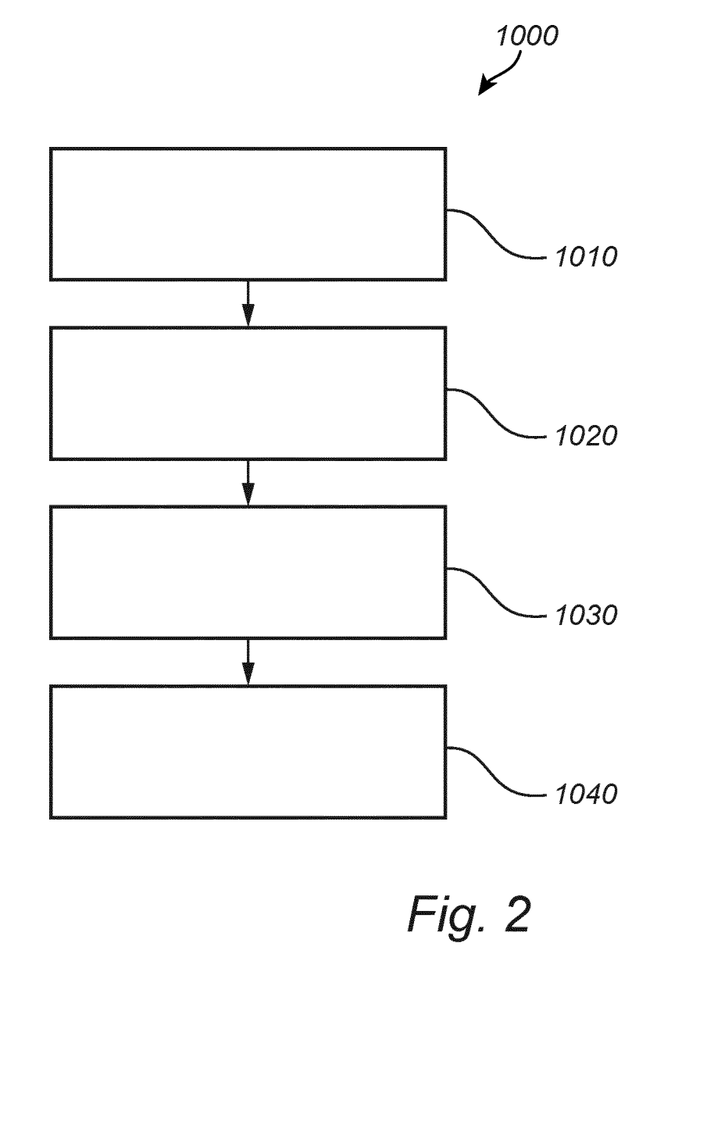
FIG. 2 is a schematic illustration of a method which the controller is configured to perform, in accordance with some embodiments.

With reference to FIGS. 1 and 2, a method 1000 which the controller 120 may be configured to perform, in accordance with some embodiments, will be described.

The controller 120 may be configured to receive, at step 1010, an input signal representative of a desired luminous flux.

Based on the desired luminous flux, the controller 120 may be configured to, at step 1020, select at least one LED filament 110 to which to provide power supply. Depending on the desired luminous flux, one or more of the LED filaments 110 may be selected.

The controller 120 may further select, at step 1030, a power level of the at least one selected LED filament. The selected power level of a first selected LED filament (such as the first LED filament 110*a*) may differ from the selected power level of a second selected LED filament (such as the second LED filament 110*b*). However, the selected power levels of two or more selected LED filaments may also be (at least substantially) equal.

Further, the controller 120 may be configured to, at step 1040, provide power supply to the at least one selected LED filament in accordance with the selected power levels. The combined luminous flux of the LED filament arrangement 105 (comprising the LED filaments 110*a-c*, which may individually be illuminated or turned off) may then correspond to the desired luminous flux.

Figure 3:
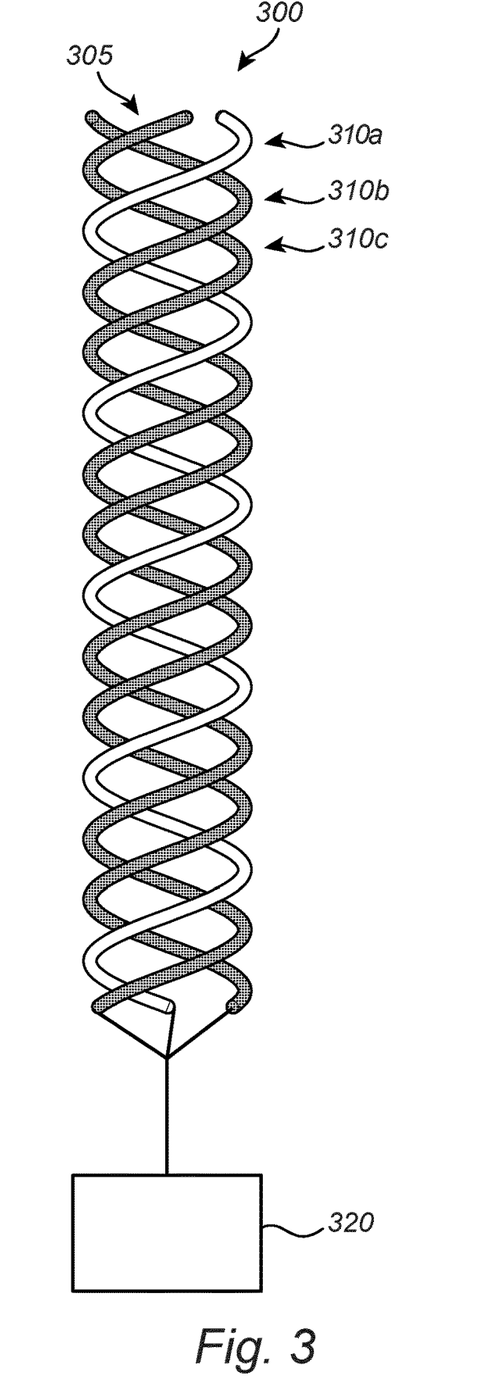
FIG. 3 shows a LED filament system in which only one LED filament is illuminated.

With reference to FIG. 3, dimming of a LED filament system 300, in accordance with some embodiments, will be described.

FIG. 3 shows a LED filament system 300, illustrated during dimming of the LED filament arrangement 305. The LED filament system 300 may be equivalent to the LED filament system 100.

In the scenario shown in FIG. 3, the controller 320 provides power supply to the LED filaments in the second mode, in which at least one LED filament is in an off-state. The controller 320 provides power supply to the first LED filament 310a, such that the first LED filament 310a is illuminated, thereby providing a luminous flux. The controller 320 does not provide power supply to the second LED filament 310b and the third LED filament 310c. The second LED filament 310b and the third LED filament 310c are thus not illuminated, and do not provide any luminous flux.

The luminous flux of the LED filament arrangement 305 is thus provided by the first LED filament 310a. The luminous flux of the LED filament arrangement 305 may thus be in a range defined by the minimum and maximum flux of the first LED filament 310a. The controller may for example provide power supply to only one LED filament 310a if the input signal received by the controller corresponds to a desired luminous flux below a first limit.

As only one LED filament 310a is illuminated, the LED filament arrangement 305 may have the appearance of one single LED filament.

Figure 4:
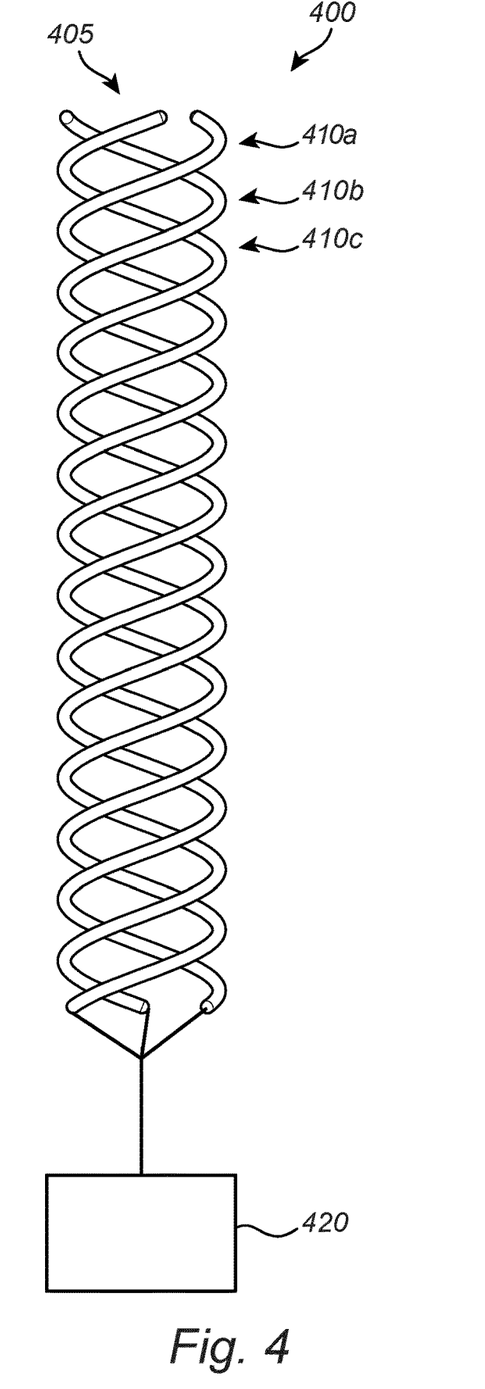
FIG. 4 shows a LED filament system in which all LED filaments are illuminated.

With reference to FIG. 4, illumination of a LED filament system 400, in accordance with some embodiments, will be described.

FIG. 4 shows a LED filament system 400, in which all LED filaments 410a-c are illuminated and provided with a power above a first power level. The LED filament system 400 may be equivalent to the LED filament system 100 described with reference to FIGS. 1 and/or the LED filament system 300 described with reference to FIG. 3.

In the scenario shown in FIG. 4, the controller 420 provides power supply to the LED filaments 410a-c in the first mode, in which all the LED filaments 410a-c are provided with a power above a first power level. As the controller 420 provides power supply to all the LED filaments 410a-c, they are all illuminated, thereby each contributing to the luminous flux. The luminous flux of the LED filament arrangement 405 comprises luminous flux provided by all the LED filaments 410a-c. The luminous flux of the LED filament arrangement 405 may thus be in a range defined by the minimum flux of the three LED filaments 410a-c combined, and the maximum flux of the three LED filaments 410a-c combined. The controller may for example provide power supply to all the LED filaments 410a-c if the input signal received by the controller corresponds to a desired luminous flux above a second limit.

As all the LED filaments 410a-c are provided with a power above a first power level, they all emit light above a first light intensity level. When all the LED filaments 410a-c are illuminated and arranged closely together, the emitted light may, when seen at a certain distance, appear to originate from a continuous cylindrical surface. Thus, the light and illumination may be uniformly distributed around the LED filament arrangement 405.

Figure 5:
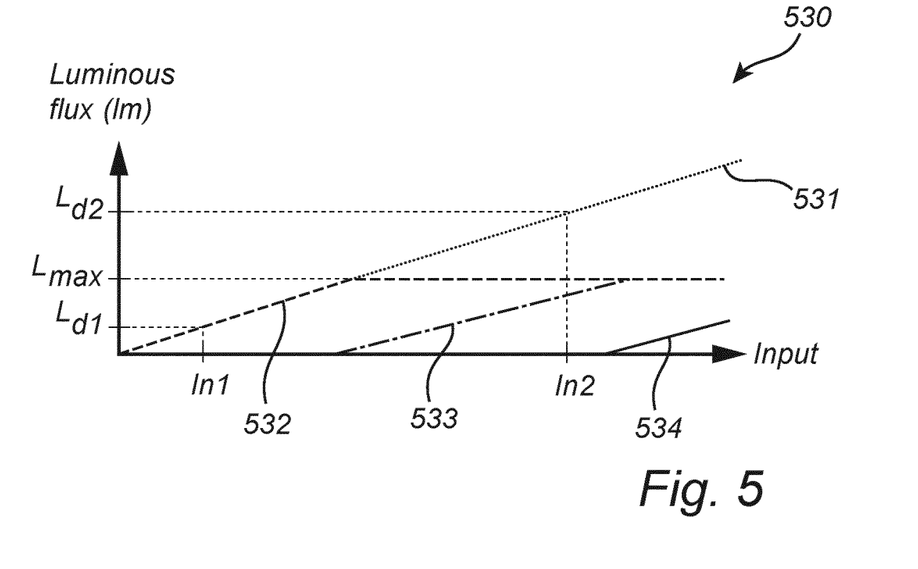
FIG. 5 is a plot showing the relationship between an input value and the luminous flux provided by the LED filaments, in accordance with some embodiments.

With reference to FIG. 5, a method for dimming a LED filament system, such as any LED filament system 100-400 described above with reference to the preceding figures will be described, in accordance with some embodiments.

FIG. 5 shows a graph of the relationship 530 between different input values (on the horizontal axis) and the corresponding luminous flux levels (on the vertical axis) of the LED filaments, in accordance with some embodiments.

The relationship 530 describes the configuration of a controller of a LED filament system, such as any of the controllers 120-420 described above with reference to the preceding figures. The controller receives an input value In1, In2 corresponding to a desired luminous flux level $L_{d1}$, $L_{d2}$ and provides powering to one or more LED filaments of the LED filament system, such that the LED filament arrangement provides the desired luminous flux.

For low input values (such as the first input In1), i.e. inputs corresponding to desired luminous flux below a maximum flux level $L_{max}$ of a first LED filament (such as the first desired luminous flux $L_{d1}$), the controller is configured to provide powering to a first LED filament only. The first LED filament is thus illuminated and provides a first luminous flux 532. The powering level of the first LED filament is adapted such that the luminous flux 532 of the first LED filament reaches the desired luminous flux $L_{d1}$.

If the input increases (e.g. to second input In2) such that the desired luminous flux increases above the maximum flux level $L_{max}$ of the first LED filament (e.g. the second desired luminous flux $L_{d2}$), the controller provides power to the first LED filament to provide maximum luminous flux 532. The controller further provides power to a second LED filament, such that it provides a second luminous flux 533. The power supplied to the second LED filament is adapted by the controller such that the total luminous flux 531 (formed by the addition or superposition of the first luminous flux 532 and the second luminous flux 533) reaches the desired luminous flux $L_{d2}$.

In case the input increases further, the controller may provide power to a third LED filament, providing a third luminous flux 534, while maintaining the first luminous flux 532 and the second luminous flux 533 at the maximum flux level $L_{max}$.

Figure 6:
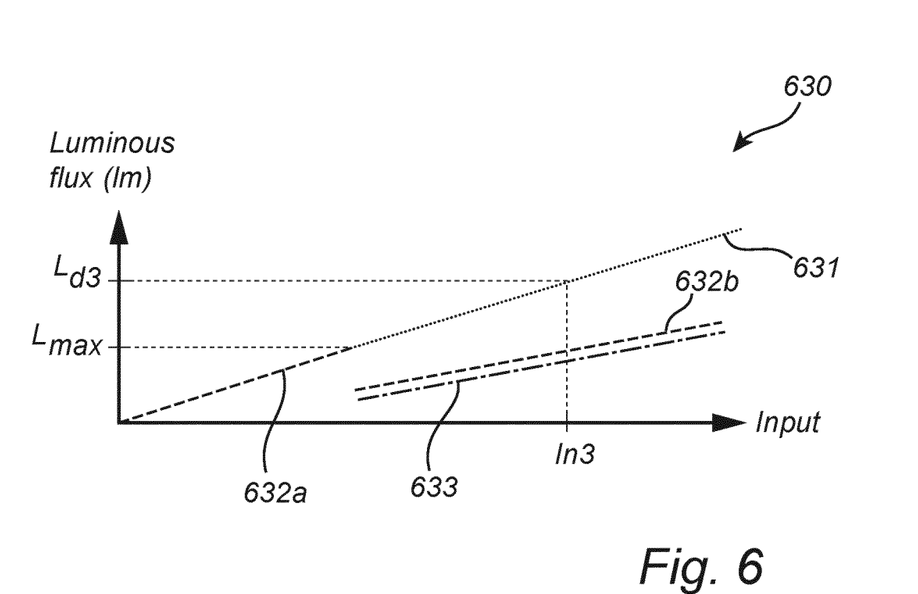
FIG. 6 is a plot showing the relationship between an input value and the luminous flux provided by the LED filaments, in accordance with some embodiments.

With reference to FIG. 6, a method for dimming a LED filament system, such as any LED filament system 100-400 described above with reference to preceding figures will be described, in accordance with some embodiments.

Similar to FIG. 5, FIG. 6 shows a graph of the relationship 630 between different input values (on the horizontal axis) and the corresponding luminous flux levels (on the vertical axis) of the LED filaments, in accordance with some embodiments.

In the present embodiment, as in the embodiment described with reference to FIG. 5, a first LED filament is powered by the controller to provide luminous flux levels 632a up until a maximum flux level $L_{max}$ of a LED filament.

For an input $In_3$ corresponding to a desired luminous flux $L_{d3}$ higher than the maximum flux level $L_{max}$ of a LED filament, the controller is configured to provide power supply to the first LED filament and a second LED filament at equal levels. Thus, the first LED filament provides a first luminous flux 632b equal to a second luminous flux 633 provided by the second LED filament. The power supply level of the first LED filament and the second LED filament is selected such that the combined luminous flux 631 reaches the desired luminous flux $L_{d3}$.

Figure 7:
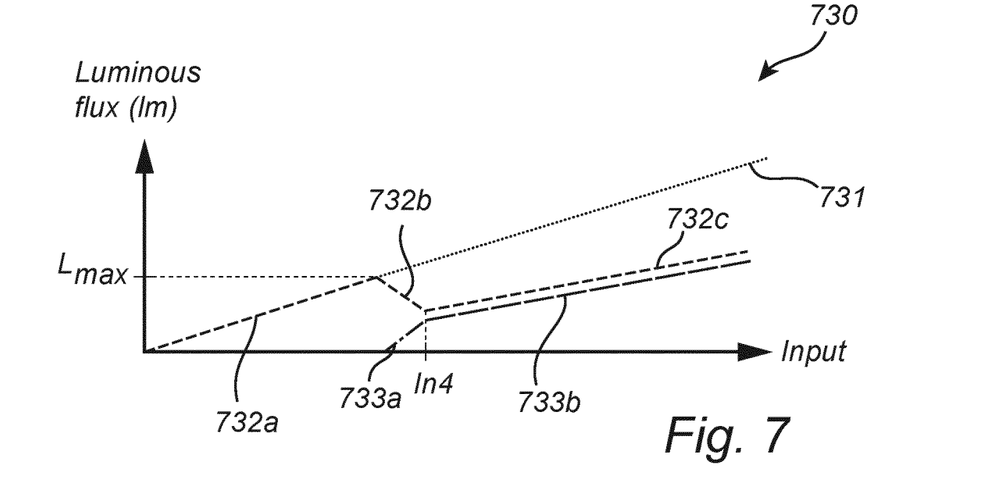
FIG. 7 is a plot showing the relationship between an input value and the luminous flux provided by the LED filaments, in accordance with some embodiments.

With reference to FIG. 7, a method for dimming a LED filament system, such as any LED filament system 100-400 described above with reference to preceding figures will be described, in accordance with some embodiments.

Like FIGS. 5 and 6, FIG. 7 shows a graph of the relationship 730 between different input values (on the horizontal axis) and the corresponding luminous flux levels (on the vertical axis) of the LED filaments, in accordance with some embodiments.

As in the embodiments described with reference to FIGS. 5 and 6, luminous flux levels up until the maximum flux level $L_{max}$ are provided by a first LED filament (first luminous flux 732a).

If the input increases such that the desired luminous flux increases above the maximum flux level $L_{max}$, the controller is configured to provide power supply to a second LED filament. In a certain interval, from the input corresponding to the maximum luminous flux to a threshold input 1114, the controller decreases the power supply to the first LED filament such that the first luminous flux 732b decreases as the input increases. To ensure that the combined luminous flux 731 still increases to provide the desired luminous flux, powering to the second LED filament is adapted such that the second luminous flux 733a increases at a higher rate than the decrease of the first luminous flux 732b.

At the threshold input $In_4$, the first LED filament and the second LED filament provide luminous flux at the same level. For input values above the threshold input $I_{n4}$, the controller is configured to provide the first LED filament and the second LED filament with equal power supply. Thus, the first LED filament provides the first luminous flux 732c at the same level as the second luminous flux 733b provided by the second LED filament.

Figure 8:
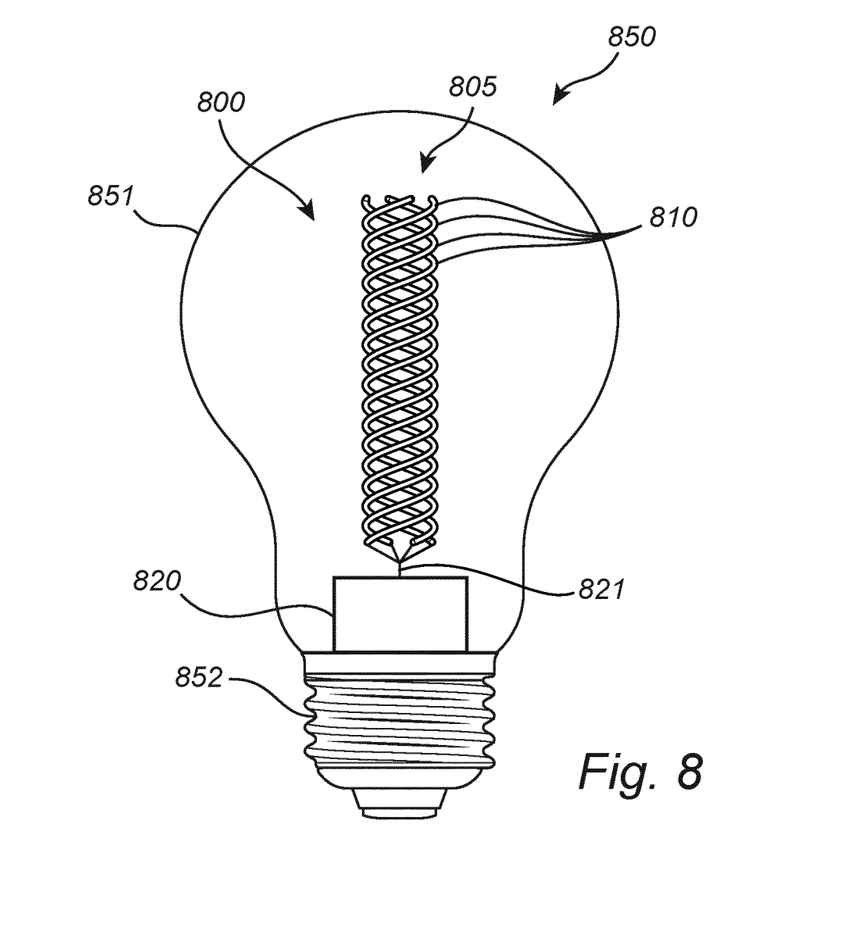
FIG. 8 is a schematic illustration of a lighting device, in accordance with some embodiments.

With reference to FIG. 8, a lighting device 850, in accordance with some embodiments, will be described. The lighting device 850 comprises a LED filament system 800 comprising a plurality of LED filaments 810 and a controller 820. The LED filament system 800 may be equivalent to any of the LED filament systems 100-400, described above with reference to FIGS. 1-4, except that it comprises four LED filaments 810, thereby forming a quadruple helix. Further, the controller 820 may be configured to perform any of the methods described with reference to FIG. 2, 5, 6 or 7.

The lighting device further comprises an at least partially light-transmissive envelope 851, which envelops the LED filaments 810 of the LED filament system 800. Further, the lighting device comprises a base 852, on which the envelope 851 is mounted. The controller 820 is arranged at the base of the lighting device, and inside the envelope 851. However, in other embodiments, the controller 820 may be arranged within the base 852.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality.

The mere fact that certain features are recited in mutually different dependent claims does not indicate that a combination of these features cannot be used to advantage.

The invention claimed is:

1. A light-emitting diode, LED, filament system comprising:
a LED filament arrangement comprising a plurality of LED filaments having a width (W), wherein the plurality of LED filaments is interwound around a common central axis (A) such that each of the LED filaments has a spiral-shape,
neighboring LED filaments differ by a translation pitch (t) along the common central axis (A), wherein said translation pitch (t) is in a range from 1 to 5 times the width (W) of one of said LED filaments, and
a controller configured to control power supply to the LED filaments such that at least one of said plurality of LED filaments is individually controllable, wherein
said controller is configured to control the power supply to the LED filaments in a first mode, in which all of the LED filaments are in an on-state and the controller provides power supply above a first power level to the LED filaments, and in a second mode, in which at least one of the LED filaments is in an off-state, and
wherein, for a given translation pitch (t), the LED filament arrangement provides a light distribution corresponding in said first mode to a uniform light-emitting surface, and in said second mode to at least one light-emitting spiral,
wherein the controller is configured to:
receive an input signal representative of a desired luminous flux;
select, based on the desired luminous flux, at least one LED filament to which to provide power supply;
select a power level of said at least one selected LED filament to provide the desired luminous flux; and
provide power in accordance with the selected power level to said at least one selected LED filament, and
wherein, if said desired luminous flux ($L_D$) is below a first limit ($L_{max}$), the controller is configured to provide power supply to only one LED filament and if said desired luminous flux is above a second limit, the controller is configured to provide power supply to all LED filaments of the LED filament arrangement.

2. The LED filament system according to claim 1, wherein each of the LED filaments is arranged in a spiral-shape having a substantially constant spiral pitch (p).

3. The LED filament system according to claim 2, wherein said spiral pitch (p) is in a range from 8 to 20 times a width (W) of one of said LED filaments.

4. The LED filament system of claim 1, wherein said width (W) is in a range from 1 to 4 mm.

5. The LED filament system of claim 1, wherein said controller is further configured to, if said desired luminous flux is above a threshold corresponding to a maximum flux level of a first LED filament:
provide power to said first LED filament corresponding to said maximum flux level; and
provide power to a second LED filament to achieve said desired luminous flux.

6. The LED filament system of claim 1, wherein said controller is further configured to, if said desired luminous flux is above a threshold corresponding to a maximum flux level of a first LED filament:
provide power to said first LED filament and at least one second LED filament at equal levels.

7. The LED filament system of claim 1, wherein said controller is further configured to:
if said desired luminous flux is above a first threshold corresponding to a maximum flux level of a first LED filament and below a second threshold, provide power to said first LED filament at a first level lower than said maximum flux level, and provide power to a second LED filament at a level lower than said first level; and if said desired luminous flux is above said second threshold, provide power to said first LED filament and a second LED filament at equal levels.

8. The LED filament system of claim 1, wherein each of the LED filaments is arranged in a spiral-shape having a substantially constant radius (r).

9. The LED filament system of claim 1, wherein the LED filament arrangement comprises 2 to 8 LED filaments.

10. A lighting device comprising:
a LED filament system as defined in any of the claim 1,
an at least partially light-transmissive envelope, enveloping at least the plurality of LED filaments of the LED filament arrangement; and
a base on which the envelope is mounted, wherein the base is adapted to be connected with a luminaire socket.

* * * * *